United States Patent [19]

Elser et al.

[11] Patent Number: 5,139,882
[45] Date of Patent: Aug. 18, 1992

[54] AQUEOUS POLYACRYLATE SYSTEMS FOR VARNISHING PLASTIC SURFACES

[75] Inventors: Wilhelm Elser, Griesheim; Klaus Langerbeins, Langen; Dieter Tessmer, Rüsselsheim; Ursula Rausch, Griesheim; Karl-Josef Fölsch, Mainz, all of Fed. Rep. of Germany

[73] Assignee: Rohm GmbH Chemische Fabrik, Darmstadt, Fed. Rep. of Germany

[21] Appl. No.: 468,942

[22] Filed: Jan. 23, 1990

[30] Foreign Application Priority Data

Jan. 28, 1989 [DE] Fed. Rep. of Germany ....... 3902555

[51] Int. Cl.⁵ .............................................. C08F 20/06
[52] U.S. Cl. ....................................... 428/522; 523/201; 524/561; 526/318.44; 526/326
[58] Field of Search ................ 428/522; 523/201; 524/561; 526/326, 318.44

[56] References Cited

U.S. PATENT DOCUMENTS

| | | | |
|---|---|---|---|
| 4,288,499 | 9/1981 | Kielbania, Jr. ................ | 428/518 |
| 4,468,498 | 8/1984 | Kowalski et al. ............. | 523/201 |
| 4,594,363 | 6/1986 | Blankenship et al. ......... | 523/201 |
| 4,777,632 | 10/1988 | Wenzel et al. ............... | 526/320 |
| 4,897,291 | 1/1990 | Kim ............................ | 524/69 |

FOREIGN PATENT DOCUMENTS

| | | | |
|---|---|---|---|
| 1171741 | 7/1984 | Canada .......................... | 117/31 |
| 0018847 | 11/1980 | European Pat. Off. ........... | 428/518 |
| 0115066 | 8/1984 | European Pat. Off. ........... | 526/320 |
| 0020125 | 12/1988 | European Pat. Off. ........... | 117/31 |
| 1036307 | 2/1986 | Japan ............................ | 526/326 |

Primary Examiner—Paul R. Michl
Assistant Examiner—Andrew E. C. Merriam
Attorney, Agent, or Firm—Oblon, Spivak, McClelland, Maier & Neustadt

[57] ABSTRACT

Varnishing plastic surfaces with a clear or pigmented aqueous dispersion of a (meth)acrylate copolymer of (a) 20 to 90% by weight of acrylic and/or methacrylic acid alkyl or cycloalkyl esters with 1 to 10 carbon atoms in the ester group; (b) 80 to 10% by weight of acrylic and/or methacrylic acid esters with aromatic groups as the ester group or containing aromatic groups in the ester group; and (c) optionally, small quantities of other monomers, results in the formation of a firmly adhering, water and alcohol resistant finish. The copolymers are preferably emulsion polymers and are synthesized as multiple-phase polymers according to the core-shell model.

13 Claims, No Drawings

AQUEOUS POLYACRYLATE SYSTEMS FOR VARNISHING PLASTIC SURFACES

BACKGROUND OF THE INVENTION

1 Field of the Invention

The present invention relates to aqueous dispersions of poly(meth)acrylates for forming finishing coats on solid plastic surfaces by means of varnishing, a method for varnishing plastic articles with such aqueous dispersions, and plastic articles which have been varnished with such aqueous dispersions.

2. Discussion of the Background

After polymerization of plastic raw materials into semi-finished or finished products, the formed parts thus-obtained are usually given an additional surface treatment. This surface treatment, which at its simplest may take the form of coating with a varnish, may be done both for both decorative and functional reasons. In practice, these two reasons for varnishing plastic objects overlap in most cases. With a clear or pigmented varnish, for example, one can improve the luster or impart a variety of colors to the plastic surfaces, while at the same time substantially increasing the weather-resistance of plastics, such as polycarbonates, acrylonitrile-butadiene-styrene polymers and polyphenylene oxide, which are subject to severe photochemical degradation when exposed to weathering.

The varnish system used for varnishing the shaped parts is selected according to the nature of the surfaces and the particular requirements for the varnish finish coat. Generally used for this purpose are oxidatively drying fatty acid containing synthetic resin varnishes, chemically vulcanizing multiple-component varnishes of epoxide, polyurethane or unsaturated polyester resins and primarily hard polyacrylates, i.e., varnishes with a relatively high proportion of poly(methyl methacrylate). The polyacrylate systems have the advantage over the other varnish systems in their weather-resistance, i.e., they do not yellow and are thus not subject to degradation, and therefore the mechanical properties of the coatings are stable, they are ethanol- and water-resistant and are simple to apply to surfaces in their organic solutions. (Ullmann, *Encyklopädie der Technischen Chemie*, 4th Ed., Vol. 15, pp. 343-345).

For reasons of both environmental protection and work safety, and also because of the danger of acceleration of the formation of stress cracks and the consequent change in the mechanical properties of the plastics due to the effects of organic solvents, it would be an advance to replace solvent-containing varnishes with aqueous systems.

DE-A 30 07 936 discloses aqueous polymer dispersions for the formation of protective and decorative coatings, on plastic substrates among others, which are combination dispersions composed of cellulose esters and poly(meth)acrylate and/or copolymers of poly(meth)acrylates, and which pursuant to the disclosure contain fatty acid modified resins such as oil or fatty acid modified alkyd resins, and which offer the important advantages over prior art cellulose ester/poly(meth)acrylate combination dispersions of surface hardness and good alcohol resistance when used as coating materials. Aqueous dispersions that are prepared by polymerization of (meth)acrylic acid esters containing dissolved cellulose esters and which according to DE-A 30 07 936 yield coatings with inadequate properties are described in EP-B 0 010 424 (corresponds to U.S. Pat. No. 4,252,697) and in DE-A 32 00 765 (corresponds to U.S. Pat. Nos. 4,415,703 and 4,521,565). Suitable monomers for the preparation of the cellulose ester containing poly(meth)acrylate phases according to the above-mentioned patents are acrylic and/or methacrylic acid esters with alkyl, cycloalkyl, phenyl or benzyl radicals as ester radicals.

The preparation of varnishes pursuant to DE-A 30 07 936, however, proves to be disadvantageous and risky in many respects, since what is used for the cellulose ester, as is demonstrated throughout the examples, is nitrocellulose, which is dissolved in the monomers and other organic solvents and subjected to rather high temperatures for a rather long period of time during the polymerization of the monomers. The advantage of using aqueous systems instead of polymer solutions in organic solvents for producing the coating is largely lost in this process, because of the concomitant use of relatively large quantities of organic solvent in preparing the dispersion and the need for further large quantities of solvent for the preparation of the varnish from the polymer emulsions, as the description of their preparation shows.

Dispersions of (meth)acrylate polymers that are essentially obtained by emulsion polymerization of methacrylic acid esters and acrylic acid esters of the type in which the ester group contains straight-chain or branched alkyl groups with 1 to 8, preferably 1 to 4 carbon atoms, particularly the methyl and ethyl esters, constitute the common, commercially available poly(meth)acrylate dispersions. Attempts to produce plastic varnishes with given properties with dispersions of this kind surprisingly showed that the resulting coatings, in comparison with those prepared from solutions, in spite of having an identical or similar structure of corresponding monomers, did not display the requisite profile of properties. Dispersion polymers with relatively high minimum film formation temperatures (MFT >80° C.) produced virtually no films. Soft polymers used, i.e., polymers prepared with ester groups from long alkyl radicals, e.g., $C_4$ to $C_8$ alkyl radicals, yielded films that were adherent but sticky and not alcohol-resistant.

High resistance to alcohol is required, for example, for the plastic housings of many hi-tech consumer products, such as television sets, video equipment, phonographic equipment, and kitchen appliances, as well as computer housings.

SUMMARY OF THE INVENTION

Accordingly, it is an object of the present invention to provide aqueous polymer dispersions that are easy and safe to prepare and when used for the preparation of finishing varnishes for plastic surfaces produce coatings with the necessary qualities, such as high adherence and water- and alcohol-resistance, but do not incur the above-discussed disadvantages of solvent-containing varnish systems.

It is another object of the present invention to provide a method for varnishing plastic articles with such aqueous polymer dispersions.

It is another object of the present invention to provide plastic articles which have been varnished with such aqueous polymer dispersion.

These and other objects, which will become apparent during the course of the following detailed description, have been achieved by the inventors' discovery that aqueous dispersions of polymers comprising (a) 20 to 90% by weight of an alkyl or cycloalkyl (meth)acrylate; (b) 80 to 10% by weight of (meth)acrylate esters in which the ester groups are or contain aromatic groups; and (c) optionally, small amounts of other comonomers provide coatings with the appropriately high required properties on solid plastic surfaces.

DETAILED DESCRIPTION OF THE PREFERRED EMBODIMENTS

Thus, one aspect of the present invention relates to an aqueous dispersion of film-forming (meth)acrylate polymers for creating a finishing coat on solid plastic surfaces by varnishing, characterized in that the (meth)acrylate polymers are copolymers comprising:

(a) 20 to 90% by weight of acrylic and/or methacrylic acid alkyl or cycloalkyl esters with 1 to 10 carbon atoms in the ester group;

(b) 80 to 10% by weight of acrylic and/or methacrylic acid esters with aromatic groups as the ester group or containing aromatic groups in the ester group;

(c) 0 to 5% by weight of a copolymerizable carboxylic acid;

(d) 0 to 10% by weight of a copolymerizable ureido compounds; and (e) 0 to 20% by weight of another copolymerizable monomer.

The present copolymers are preferably emulsion polymers and, in particular, are synthesized as multiple-phase polymers according to the core-shell model, for example.

The dispersions of the present invention contain no organic solvents, are practically odorless and can be diluted with water. The coatings formed from these dispersions on plastic surfaces adhere well, are hard, resistant to water and ethanol and hence are suitable for the finishing varnish coat of plastic objects. The dispersion is readily applied to the surface to be treated using conventional techniques, and there is no need for a special hardening reaction on the plastic surface in order to produce a varnish coat, whether clear or pigmented, with properties that meet industrial standards.

The (meth)acrylate polymers to be used according to the present invention are applied in aqueous dispersion form to the plastic surfaces of objects to be treated and to that end are prepared preferably by emulsion polymerization in an aqueous medium. In the dispersions of the present invention, (meth)acrylate polymers are used that have film-formation temperatures above 0° C., preferably in the range from 0° to 80° C. Film formation must take place at a temperature between 0° and 100° C. with or without auxiliary film-forming agents.

The polymers essentially composed of aliphatic and aromatic esters of acrylic and/or methacrylic acid, which are hence hydrophobic, may, however, contain small quantities of less hydrophobic or even decidedly hydrophilic monomers as structural units. These hydrophilic monomers are polymerizable carboxylic acids, such as acrylic acid, methacrylic acid, maleic acid or their anhydrides. They are incorporated into the dispersion polymer in quantities equal to 0 to 5%, in particular 0.1 to 3% by weight. Monomers with basic groups, such as N-dimethylaminoethylmethacrylate or acrylic and methacrylic amides, which also contain alkyl, cycloalkyl or aryl groups in the amido radical, or monomers with hydrophilic alcohols in the ester radical, such as 2-[2-(2-ethoxyethoxy)ethoxy]ethyl methacrylate, may be incorporated into the polymer in quantities equal to less than 10% by weight, preferably under 5% by weight down to 0% by weight. The incorporation of such polar monomers in small quantities has a positive effect on the stability of the polymer-containing dispersion by counteracting clumping. The long-term stability thus achieved is essential for the shipment and storage of the (meth)acrylate polymer dispersions of the present invention.

Given the heavily hydrophobic nature of the (meth)acrylate polymer, what is involved is a polymer prepared primarily or exclusively from esters of acrylic or methacrylic acid. In the preparation of the polymer, however, yet other, also virtually water-insoluble comonomers, such as styrene, alpha-methyl styrene, vinyl acetate, or more hydrophilic polymerizable compounds, such a N-vinyl imidazole and polymerizable ureido compounds may also be used in such proportions that the desired properties of the varnish on the plastic surface are maintained. In general, they are present in a proportion between 0 and 20% by weight, preferably between 0.1 and 10% by weight.

The (meth)acrylate polymer is primarily, i.e., in a proportion from 80 to 100% by weight, particularly from 85 to 99% by weight and especially from 80 to 98% by weight, synthesized from esters of acrylic and/or methacrylic acid, the said esters being copolymers composed of 20 to 90% by weight, particularly 30 to 80% by weight, and especially 40 to 70% by weight of acrylic acid and/or methacrylic acid alkyl or cycloalkyl esters with 1 to 10 carbon atoms, particularly with 1 to 6 carbon atoms, especially alkyl esters with 1 to 4 carbon atoms in the ester radical, and 80 to 10% by weight, particularly 20 to 70% by weight, especially 30 to 60% by weight of acrylic acid and/or methacrylic acid esters with aromatic groups forming the ester radical or with aromatic groups contained in the ester radical.

As the aliphatic o cycloaliphatic acrylic and methacrylic ester the following, given by way of example, may, be used: methyl acrylate, ethyl acrylate, isopropyl acrylate, n-butyl acrylate, methyl methacrylate, ethyl methacrylate, n-butyl methacrylate, n-hexyl methacrylate, 2-ethylhexyl methacrylate, cyclohexyl methacrylate, 3,3,5-trimethylcyclohexyl methacrylate.

As the acrylic and methacrylic ester with aromatic groups as the ester group or containing aromatic groups in the ester group, the following may be used according to the present invention.

Compounds with the general formula (I):

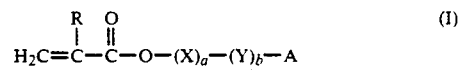
(I)

in which

R is H or $CH_3$;

X is $CH_2$;

a is 0, 1, 2, 3, or 4; or X may also be a branched $C_3H_6$— or $C_4H_8$— group, when a is 1;

Y is O or NH;

b is 0 or 1; and

A is a $C_6$ to $C_{10}$ aryl radical, such as phenyl or $C_1$ to $C_4$ alkyl phenyl or naphthyl.

Examples of compounds that correspond to the general formula (I) are: phenyl acrylate, p-methylphenyl acrylate, phenyl methacrylate, p-methylphenyl methacrylate, 1-naphthyl methacrylate, benzyl methacrylate, benzyl acrylate, 2-phenylethyl methacrylate, 3-phenyln-propyl acrylate, 2-phenoxyethyl methacrylate, 2-(phenylamino)ethyl methacrylate.

In the aqueous dispersions of the present invention, the (meth)acrylate polymers may be synthesized as multiple-phase polymers according to the core-shell model, for example. In the simplest case, a polymer particle acting as a core is enveloped in another polymer material of a different composition offering certain advantages. It is known that such polymer structures can be produced particularly easily by emulsion polymerization (see *Journal of Polymer Science*, Vol. 22, pp. 1365-1372, 1984). For this purpose, the aqueous polymer dispersions pursuant to the invention can be most advantageously prepared by polymerization of suitable monomers in aqueous emulsion, and in some cases in suspension according to relevant conventional art processes (see, in this regard, H. Rauch-Puntigam, Th. Volker, "Acryl- und Methacrylverbindungen," pp. 217-228, Springer-Verlag, Heidelberg 1967; Ullmann, *Encyklopädie der Technischen Chemie*, 4th Ed., Vol. 19, pp. 11-14 and 125-141, Verlag Chemie, 1980).

To achieve a multiple-phase synthesis of the dispersed polymer particles, during emulsion polymerization, as is known, different monomer compositions are added successively to the same polymerization batch and polymerized in each case under the conditions of emulsion polymerization. The synthesis of the dispersed polymer particles of the present invention for varnishing plastic surfaces can advantageously be carried out so that first a core is formed with a high percentage, i.e., with more than 70% by weight and particularly with 90 to 99% by weight, of (meth)acrylic acid ester units—both with alkyl and also with aryl ester groups—at which stage approx. 0.5 to 5% by weight of multi-functional (cross-linking) monomers, such as glycol dimethacrylate, butandiol-1,4-diacrylate, allyl methacrylate, triallyl cyanurate, can also be incorporated in the polymerization. The multifunctional monomers serve to create a certain desirable cross-linkage of the core and create graft sites for attaching the polymer shell to the core. In the polymer shell or shells are incorporated 30 to 100% by weight, particularly 40 to 80% by weight, of the total acrylic and/or methacrylic acid esters with aromatic groups constituting or contained in the ester radical in the core-shell polymer as a whole, in addition to other monomers, particularly acrylic and/or methacrylic acid alkyl esters with 1 to 10 carbon atoms in the alkyl radical. The weight ratio of acrylic or methacrylic acid esters with aromatic groups constituting or contained in the ester radical to acrylic or methacrylic acid alkyl esters is in the range from 30:70 to 70:30.

The polymerizable carboxylic acids incorporated in the dispersion polymer in the amount of 0 to 5% by weight may be randomly distributed throughout the polymer or in the case of core-shell polymers may either be predominantly in the core or predominantly in the shell or shells or present more or less evenly or even unevenly throughout the core-shell phases. In special cases it has proven advantageous to incorporate other monomers in the polymer that will facilitate the adhesion of the coating obtained from the dispersion polymer to the plastic substrate. Such adhesion facilitating groups may be, for example, the polar and hydrophilic ureido groups or imidazole groups, which interact with polar plastic substrates in particular. Preferred monomers with such adhesive groups are, for example, N-methacrylamidomethylene urea, N-(2-methacryloyloxyethyl)ethylene urea, N-vinylimidazole. They may be incorporated in the dispersion polymer of the present invention in quantities equal to 0 to 10% by weight, preferably 0.1 to 5% by weight.

Emulsion polymerization is carried out with the conventional non-ionic, cationic and anionic emulsifiers, such as the alkali and ammonium salts of sulfated fatty alcohols, aromatic sulfonic acids or sulfonated ethylene oxide adducts.

Suitable anionic emulsifiers are, for example, alkyl phenols sulfonated, neutralized with alkali and hydroxyethelated, which can be prepared, for example, from nonylphenol or triisobutylphenol adducts with 3 to 30 units of ethylene oxide per molecule.

The polymerization may be carried out by a batch process or by an inflow process, such as the monomer inflow process or the emulsion inflow process. The emulsion inflow process offers particular advantages. In this process, only a part of the water phase, as a rule 10 to 70% of the total quantity, is placed in the polymerization vessel. In the remaining portion of the water phase, which as a rule contains a portion of the emulsifying agent, the monomer phases are emulsified under conditions under which no polymerization occurs, and these emulsions are successively added to the reaction vessel, where polymerization conditions prevail.

The process can be handled in a variety of ways. One can, for instance, allow the initiator or a portion of the emulsifier to flow in gradually or add it in batches separate from the monomer phases. For polymerization initiators, alkali or ammonium peroxodisulfates are generally used, but in addition to or instead of them, other preferably water-soluble initiators, such as 4,4'-azobis-4,4'-dicyanovaleric acid, or redox systems, such as peroxosulfates, sulfoxy compounds and iron salts or hydrogen peroxide and iron II salts, may be used.

The latter are added separately from the monomer phase, since they will initiate polymerization at room temperature. The reaction temperature depends on the decomposition temperature of the initiator and lies in general between 10° and 100° C.

Polymerization concentration in the dispersions upon preparation is in the range of from 30 to 70% by weight solids and the viscosity of the polymer dispersions is in general in the range from 10 to 5,000 mPa s (ISO 2555).

The size of the particles of the emulsion polymer should be within the range of from 20 to 600 nm, preferably in the range of from 50 to 400 nm (as determined by photon correlation spectroscopy, also known as autocorrelation spectroscopy, with the Nanosizer ® made by Coulter Electronics, Ltd., Luton, Beds.).

The polymers have as a rule minimum film formation temperatures (MFT) in the range of from 0° C. to ca. 100° C., for example, between ca. 20° C. to 80° C. (Ullmann, *Encyklopädie der Technischen Chemie*, 4th Ed., Vol. 19, pp. 17, 19 and 141; DIN 53 787).

The materials pursuant to the invention for coating plastic surfaces have particular significance for the application of finishing coats, clear or pigmented, to serve as decorative or protective finishes on semi-finished or finished parts made of thermoplastic plastics. Polymers particularly suitable for the thermoplastic plastic parts to be coated with the aqueous polyacrylate systems of the present invention are polystyrene, impact-resistant polystyrene such as styrene-butadiene copolymer or acrylonitrile-butadiene-styrene (ABS) copolymers, polycarbonate, poly(methyl methacrylate), polyphenylene oxide (PPO), hard polyvinyl chloride (PVC), blends of polycarbonate and ABS copolymers. Use of the new aqueous polyacrylate systems offers the advantage that they form well-adhering, water and alcohol resistant coatings on the various polymers, which is an advantage because in many cases various plastics are used in consumer products. This means, moreover, that a uniform color quality can be imparted to the plastic surfaces of consumer products, even when they are synthesized from different polymer materials.

In the varnishing procedure, the aqueous polymer dispersion is applied to the object with plastic surfaces to be protected. For this purpose it is advantageous to us polymer dispersions prepared by emulsion polymerization, after dilution with water if necessary. In order to improve film formation by the polymers on the plastic surfaces, conventional film formation facilitating agents such a butyl glycol can be applied along with the polymer dispersion in quantities equivalent to 2 to 20% by weight based on the quantity of polymer. Such film formation facilitating agents are not good solvents for plastics. Therefore, they virtually do not promote stress crack corrosion of the plastic substrate. As temporary plasticizers, they evaporate out of the coating as the coated plastics are dried and stored, so that the coating quickly reaches its proper hardness. The present aqueous polymer dispersions may also contain conventional pigments, such as, e.g., titanium dioxide.

The present coatings can be applied by conventional processes, such as dipping, spraying with a hand-manipulated spray gun or mechanically by roller application, (Ullmann, *Encyklopädie der Technischen Chemie*, 4th Ed., Vol. 15, pp. 343-345 and pp. 688-695).

Having generally described this invention, a further understanding can be obtained by reference to certain specific examples which are provided herein for purposes of illustration only and are not intended to be limiting unless otherwise specified.

EXAMPLES

I. Preparation of the Dispersion

Example 1

In a 2 l reaction vessel, equipped with a reflux condenser, stirring apparatus and inflow vessel, 0.81 g of sodium lauryl sulfate and 0.54 g of ammonium peroxodisulfate are dissolved in 430 g of deionized water at 20° C.

To this solution, the following two emulsion inflows are metered in successively with stirring at 80° C.

The inflow of Emulsion I, composed of:
  266.8 g phenyl methacrylate;
  266.2 g ethyl acrylate;
  7.0 g methacrylic acid;
  4.86 g sodium lauryl sulfate;
  1.62 g ammonium peroxidisulfate; and
  470.0 g deionized water
is completed within 3 hours. Immediately thereafter, over the next hour, Emulsion II, composed of:
  83.2 g phenyl methacrylate;
  83.3 g ethyl acrylate;
  13.6 g N-(2-methacryloyloxyethyl)ethylen-urea;
  1.62 g sodium lauryl sulfate;
  0.54 g ammonium peroxodisulfate; and
  275.0 g deionized water
is metered in.

After inflow, the batch is cooled to room temperature; at 70° C., 0.45 g of 1,4-diisopropylbenzene-monohydroperoxide and 0.36 g of sodium hydroxy methyl sulfinate are added.

The dispersion is then treated with 54 g of octylphenoxy polyethoxyethanol (average degree of ethoxylation 9) and filtered. The pH of the ca. 40% dispersion is 1.9 ($r_{NS}$=70 nm).

EXAMPLE 2

In a 2 l reaction vessel, equipped with a reflux condenser stirring apparatus and inflow vessel, 0.81 g of sodium lauryl sulfate and 0.54 g of ammonium peroxodisulfate are dissolved in 430 g of deionized water at 20° C.

To this solution at 80° C. is added an emulsion composed of:
  352.8 g phenyl methacrylate;
  352.8 g ethyl acrylate;
  14.4 g methacrylic acid;
  6.48 g sodium lauryl sulfate;
  2.16 g ammonium peroxodisulfate; and
  745.0 g deionized water
within the space of 4 hours.

After inflow, the batch is cooled to room temperature; at 70° C., 0.45 g of 1,4-diisopropyl-benzene-monohydroperoxide and 0.36 g of sodium hydroxy methyl sulfinate are added. After the addition of 54 g of octylphenoxy polyethoxyethanol (average degree of ethoxylation 9) the dispersion is filtered. The pH of the ca. 40% dispersion is 2.0 ($r_{NS}$=73 nm).

II. Plastic Varnish

A. Preparation of the Colors

A mixture of:
  175 g titanium dioxide, rutile type;
  150 g aluminum silicate;
  4 g dispersion facilitating agent based on an acrylate (40% dry content);
  6 g anti-foam agent; and
  665 g of the dispersion described in Example 1 or 2 is well mixed and dispersed for ca. 24 hours in a ball mill to give 1000 g of the color mixture.
Thereupon
  30 g diethylene glycol monobutyl ether is added to the color mixture and well stirred.
  Before processing the color is allowed to set for another 24 hours.

B. Creation of the Coat

The colors of the composition indicated in A are applied with an absorption ductor to small plastic discs (120×70×3 mm in dimension) and dried for 48 hours at 23° C. and 50% relative humidity. The thickness of the dried layer is 40 μm.

C. Testing the Coat

1. The adhesiveness of the coats were tested by the grid test according to DIN 53 151. The test conditions were made more rigorous in that an adhesive strip was applied to the tested varnish and then ripped away (GT).

2. Resistance to Alcohol

In order to determine resistance to alcohol, a black felt strip soaked in alcohol with a load of 450 g/m² was moved back and forth over a stretch of 6.5 cm at a speed of 15 cm/sec. The intensity of the coloration of the felt from dissolved particles of pigment was read after 10 to 25 double strokes.

D. Results

As shown in Table 1, with both the dispersions indicated in the examples excellent adhesiveness was obtained on the following plastics: hard PVC, polycarbonate, ABS, ABS-modified polycarbonates, impact-resistant polystyrene and PPO.

Whereas the dispersion coatings in common use today were dissolved in a short time, i.e., the felt strip was darkly colored, coatings of the above-mentioned composition resulted in no or only slight coloration of the felt strip, i.e., the coatings were practically undissolved by the ethanol.

In the results of the adhesiveness tests, a decrease in adhesiveness is represented by a higher GT value, and in the results presented as GT 0/0, the second number gives the adhesion value after removal of the adhesive film.

TABLE 1

| Coating | Substrate | Adhesiveness | Resistance to Alcohol |
|---|---|---|---|
| Disp. of Ex.1 | Hard PVC | GT 0/0 | After 10 double strokes, almost no coloration, after 25 double strokes only slight coloration of the felt strip |
|  | Polycarbonate | 0/0 |  |
|  | ABS | 0/0 |  |
|  | ABS-mod. polycarbonate | 0/0 |  |
|  | Impact-resistant polystyrene | 0/0 |  |
|  | PPO | 0/1 |  |
| Disp. of Ex.2 | Hard PVC | GT 0/0 | After 10 and 25 double strokes only slight coloration of the felt strip |
|  | Polycarbonate | 0/0 |  |
|  | ABS | 0/0 |  |
|  | ABS-mod. polycarbonate | 0/0 |  |
|  | Impact-resistant polystyrene | 0/0 |  |
|  | PPO | 0/2 |  |

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the U.S. is:

1. A method for preparing a coated plastic article, comprising coating a plastic article with an aqueous dispersion, comprising a (meth)acrylate polymer, wherein said (meth)acrylate polymer is a copolymer comprising:
   (a) 20 to 90% by weight of an acrylic acid and/or methacrylic acid alkyl or cycloalkyl ester having 1 to 10 carbon atoms in the ester group;
   (b) 80 to 10% by weight of an acrylic and/or methacrylic acid ester with an aromatic group as the ester group or containing an aromatic group in the ester group;
   (c) 0 to 5% by weight of a copolymerizable carboxylic acid;
   (d) 0 to 10% by weight of a copolymerizable ureido compound; and
   (e) 0 to 20% by weight of another copolymerizable monomer.

2. The method of claim 1, wherein said acrylic and/or methacrylic acid ester with an aromatic group as the ester group or containing an aromatic group in the ester group is a compound with the general formula (I):

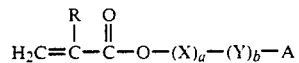

wherein
R is H or $CH_3$;
X is $CH_2$;
a is 0, 1, 2, 3, or 4; or X is a branched $C_3H_6$- or $C_4H_8$- group when X is 1;
Y is 0 or NH;
b is 0 or 1; and
A is a $C_6$ to $C_{10}$ aryl radical or $C_1$ to $C_4$ alkyl phenyl or naphthyl.

3. The method of claim 1, wherein said copolymer is produced by emulsion polymerization and is a multiple-phase polymer.

4. The method of claim 3, wherein said multiple-phase polymer is a core-shell polymer.

5. The method of claim 1, wherein said acrylic and/or methacrylic acid alkyl or cycloalkyl ester is one or more members selected from the group consisting of methyl acrylate, ethyl acrylate, isopropyl acrylate, n-butyl acrylate, methyl methacrylate, ethyl methacrylate, n-butyl methacrylate, n-hexyl methacrylate, 2-ethylhexyl methacrylate, cyclohexyl methacrylate, 3,3,5-trimethylcyclohexyl methacrylate.

6. The method of claim 1, wherein said acrylic and/or methacrylic acid ester with an aromatic group as the ester group or containing an aromatic group in the ester group is one or more members selected from the group consisting of phenyl acrylate, p-methylphenyl acrylate, phenyl methacrylate, p-methylphenyl methacrylate, benzyl acrylate, 1-naphthyl methacrylate, benzyl methacrylate, 2-phenylethyl methacrylate, 3-phenyl-n-propyl acrylate, 2-phenoxyethyl methacrylate, 2-(phenylamino)ethyl methacrylate.

7. A coated plastic article, prepared by a process comprising coating a plastic article with an aqueous dispersion comprising a (meth)acrylate polymer, wherein said (meth)acrylate polymer is a copolymer comprising:
   (a) 20 to 90% by weight of an acrylic and/or methacrylic acid alkyl or cycloalkyl ester having 1 to 10 carbon atoms in the ester group;
   (b) 80 to 10% by weight of an acrylic and/or methacrylic acid ester with an aromatic group as the ester group or containing an aromatic group in the ester group;
   (c) 0 to 5% by weight of a copolymerizable carboxylic acid;
   (d) 0 to 10% by weight of a copolymerizable ureido compound; and
   (e) 0 to 20% by weight of another copolymerizable monomer.

8. The article of claim 7, wherein said acrylic and/or methacrylic acid ester with an aromatic group as the ester group or containing an aromatic group in the ester group is a compound with the general formula (I):

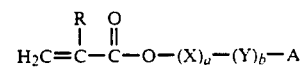

wherein
R is H or $CH_3$;
X is $CH_2$;

a is 0, 1, 2, 3, or 4; or X is a branched $C_3H_6$- or $C_4H_8$- group, when X is 1;

Y is 0 or NH;

b is 0 or 1; and

A is a $C_6$ to $C_{10}$ aryl radical or $C_1$ to $C_4$ alkyl phenyl or naphthyl.

9. The article of claim 7, wherein said copolymer is produced by emulsion polymerization and is a multiple-phase polymer.

10. The article of claim 9, wherein said multiple-phase polymer is a core-shell polymer.

11. The article of claim 7, wherein said acrylic and/or methacrylic acid alkyl or cycloalkyl ester is one or more members selected from the group consisting of methyl acrylate, ethyl acrylate, isopropyl acrylate, n-butyl acrylate, methyl methacrylate, ethyl methacrylate, n-butyl methacrylate, n-hexyl methacrylate, 2-ethylhexyl methacrylate, cyclohexyl methacrylate, 3,3,5-trimethylcyclohexyl methacrylate.

12. The article of claim 7, wherein said acrylic and/or methacrylic acid ester with an aromatic group as the ester group or containing an aromatic group in the ester group is one or more members selected from the group consisting of phenyl acrylate, p-methylphenyl acrylate, phenyl methacrylate, p-methylphenyl methacrylate, 1-naphthyl methacrylate, benzyl methacrylate, benzyl acrylate, 2-phenylethyl methacrylate, 3-phenyl-n-propyl acrylate, 2-phenoxyethyl methacrylate, 2-(phenylamino)ethyl methacrylate.

13. The article of claim 7, wherein said plastic article comprises a polymer selected from the group consisting of polystyrene, styrene-butadiene copolymer, acrylonitrile-butadiene-styrene copolymer, polycarbonate, poly(methyl methacrylate), polyphenylene oxide, polyvinyl chloride and a blend of polycarbonate and acrylonitrile-butadiene-styrene copolymer.

* * * * *